United States Patent [19]
Kirby et al.

[11] Patent Number: 5,898,784
[45] Date of Patent: Apr. 27, 1999

[54] TRANSFERRING ENCRYPTED PACKETS OVER A PUBLIC NETWORK

[75] Inventors: Alan J. Kirby, Hollis, N.H.; Jeffrey A. Kraemer, Northboro; Ashok P. Nadkarni, Shrewbury, both of Mass.

[73] Assignee: Raptor Systems, Inc., Waltham, Mass.

[21] Appl. No.: 08/963,512

[22] Filed: Nov. 3, 1997

Related U.S. Application Data

[63] Continuation of application No. 08/586,230, Jan. 16, 1996, abandoned.

[51] Int. Cl.⁶ .................................................. H04L 9/00
[52] U.S. Cl. ............................................................ 380/49
[58] Field of Search ................................... 380/23, 30, 49

[56] References Cited

U.S. PATENT DOCUMENTS

| | | | |
|---|---|---|---|
| 5,099,517 | 3/1992 | Gupta et al. | 380/49 |
| 5,161,193 | 11/1992 | Lampson et al. | 380/49 |
| 5,235,644 | 8/1993 | Gupta et al. | 380/49 |
| 5,325,362 | 6/1994 | Aziz | 370/94.3 |
| 5,416,842 | 5/1995 | Aziz | 380/49 |
| 5,442,708 | 8/1995 | Adams, Jr. et al. | 380/49 |
| 5,444,782 | 8/1995 | Adams, Jr. et al. | 380/49 |
| 5,548,646 | 8/1996 | Aziz et al. | 380/23 |
| 5,550,984 | 8/1996 | Gelb | 370/94.1 |

OTHER PUBLICATIONS

"Internet Portal, Version 1.1", pp. 1–16, Digital Equipment Corp.

"Digital Internet Tunnel V1.0", pp. 1–3, Digital Equipment Corp.

"Internet Security: Screening External Access Link (SEAL)", pp. 1–2, Digital Equipment Corp.

World Wide Web document of Digital Equipment Corporation's tunneling product, Nov. 15, 1995.

Kerberos Network Authentication Service (V5), Digital Equipment Corporation, pp. 1–106, Sep. 1993.

swIPe IP Security Protocol, Columbia University and AT&T, John Ioannidis and Matt Blaze, Dec. 1993.

Security Architecture for the Internet Protocol, R. Atkinson, Naval Research Laboratory, pp. 1–44, Aug. 1995.

IP Authentication Header, R. Atkinson, Naval Research Laboratory, pp. 1–26, Aug. 1995.

IP Encapsulating Security Payload (ESP), R. Atkinson, Naval Research Laboratory, pp. 1–24, Aug. 1995.

The Photuris Session Key Management Protocol, P. Karn, Qualcomm, W.A. Simpson, DayDreamer, pp. 1–106, Nov. 1995.

(List continued on next page.)

*Primary Examiner*—Salvatore Cangialosi
*Attorney, Agent, or Firm*—Fish & Richardson P.C.

[57] ABSTRACT

The invention features receiving encrypted network packets sent over a network at a network interface computer, and passing the encrypted network packets to a computer on an internal network.

The invention also features receiving encrypted network packets at a first computer over a network from a second computer, examining a field in each network packet to determine which of a plurality of encryption algorithms was used to encrypt the network packet, and decrypting the network packet in accordance with the determined encryption algorithm.

The invention further features receiving network packets sent over a network, determining which virtual tunnel each network packet was sent over, and routing each network packet to a destination computer in accordance with the determined virtual tunnel.

The invention features encrypting network packets at a computer connected to an internal network, passing the encrypted network packet over the internal network to a public network interface computer, and passing the encrypted network packet over a public network connected to the network interface computer.

26 Claims, 10 Drawing Sheets

OTHER PUBLICATIONS

Simple Key–Management For Internet Protocols (SKIP), Ashar Aziz, et al. Sun Microsystems, Inc., pp. 1–72, Dec. 1995.

Internet Security Association and Key Management Protocol (ISAKMP), Douglas Maughan and Mark Schertler, National Security Agency, pp. 1–117, Nov. 1995.

U.S. application No. 08/561,790, filed Nov. 22, 1994, Kirby et al.—Controlling Passage Of Packets Or Messages.

U.S. application No. 08/585,765, filed Jan. 12, 1995, Kirby et al.—Data Encryption/Decryption For Network Communication.

U.S. application No. 08/586,231, filed Jan. 12, 1995, Levesque et al.—Key Management For Network Communication.

TRANSFERRING ENCRYPTED PACKETS OVER A PUBLIC NETWORK

This is a continuation of application Ser. No. 08/586,230, filed Jan. 16, 1996, now abandoned.

BACKGROUND

This invention relates to transferring encrypted packets over a public network.

Figure 1:
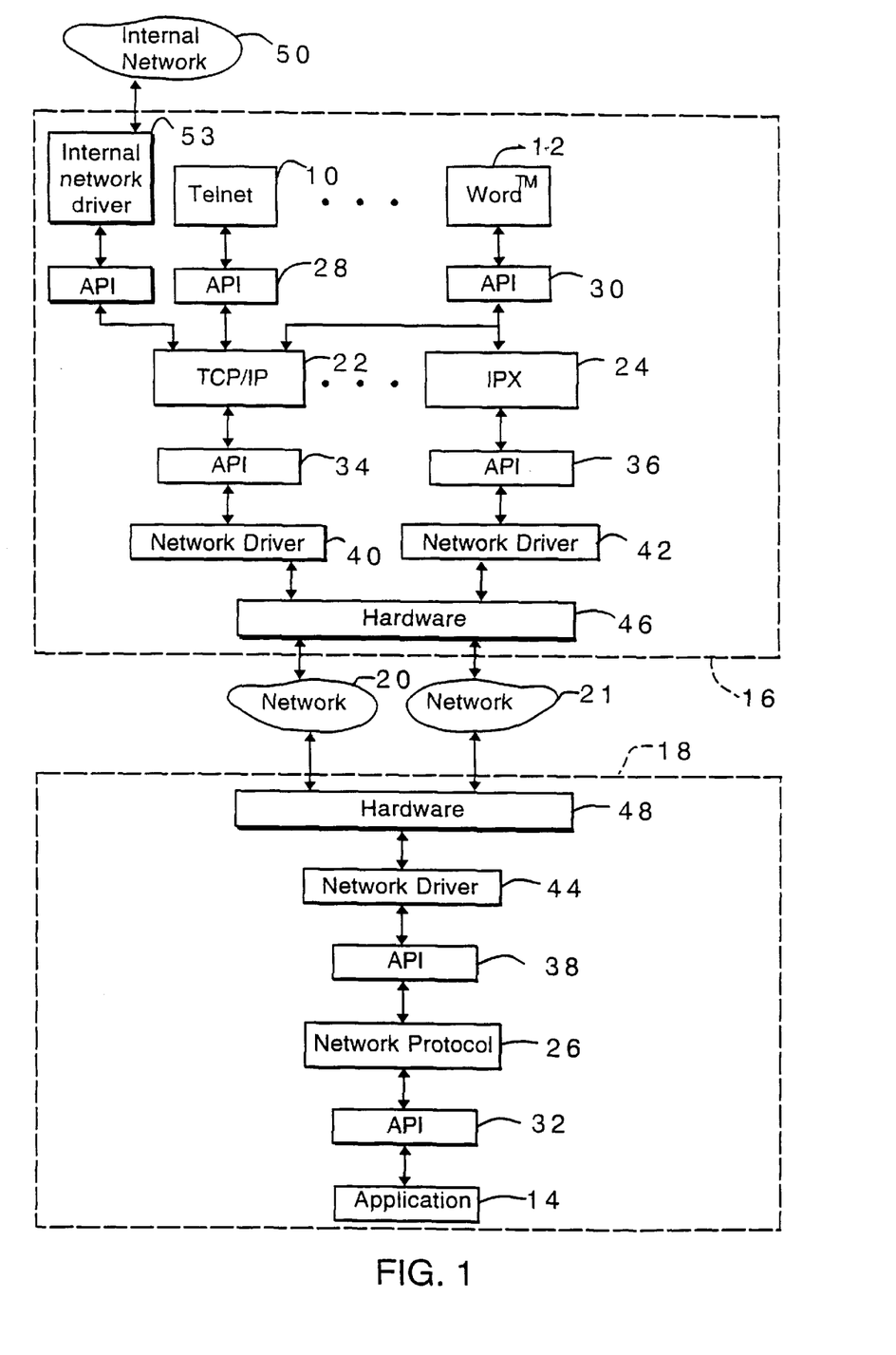
FIG. 1 is a block diagram of two computers connected together through two networks.

Referring to FIG. 1, while executing a variety of software applications, 10, 12, 14, for example, Telnet 10 or Microsoft™, Inc. Word™ 12, computers 16 and 18 may exchange data over networks 20, 21, for example, a telephone company network, a private network, or a public network such as the internet or X.25. The applications communicate using network protocols 22, 24, 26, for example, transmission control protocol/internet protocol (TCP/IP) 22 or internet packet exchange (IPX) 24, through application programming interfaces 28, 30, 32. Through application programming interfaces 34, 36, 38, the network protocols communicate with network drivers 40, 42, 44 to direct network interface hardware 46, 48 to transfer data over the networks.

While on a network, data being transmitted, including the addresses of the source and destination computers 16, 18, is accessible to others who may be monitoring the network. For security, the data is often encrypted before being sent on the network.

Figure 2:
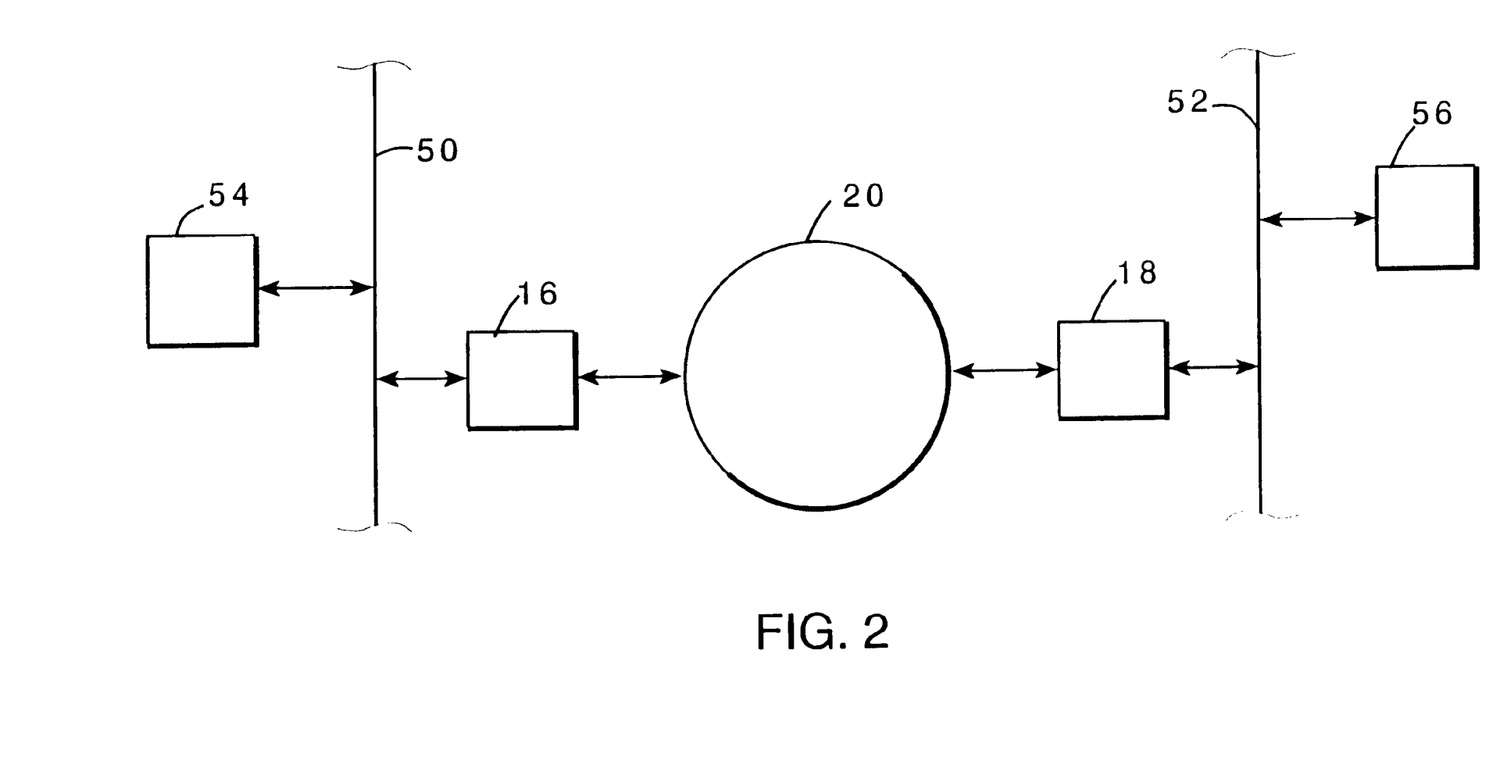
FIG. 2 is a block diagram of two firewall computers and networks.

Referring also to FIG. 2, for additional security, firewall computers 16, 18, which have direct access to a network 20 may be used to prevent unauthorized access to internal/private networks 50, 52. For example, when an internal network driver 53 within firewall computer 16 receives data from an internal computer 54 that is destined for a computer 56 on a public network, it encrypts the data and the addresses of source computer 54 and destination computer 56. Computer 16 then prepends to the encrypted data a new IP header including its own address as well as the address of a destination computer, which may also be a firewall computer, e.g., computer 18.

When a firewall computer receives a network packet from the network, it determines whether the transmission is authorized. If so, the computer examines the header within the packet to determine what encryption algorithm was used to encrypt the packet. Using this algorithm and a secret key, the computer decrypts the data and addresses of the source and destination computers 54, 56 and sends the data to the destination computer. If both the source and destination computers are firewall computers, the only addresses visible (i.e., unencrypted) on the network are those of the firewall computers. The addresses of computers on the internal networks, and, hence, the internal network topology, are hidden. This has been termed "virtual private networking" (VPN).

Encrypting/decrypting data has been performed by complex security software within applications or, to simplify the applications, encrypting/decrypting has been performed within the protocol stack of network protocols.

SUMMARY

In general, in one aspect, the invention features a method of handling network packets. Encrypted network packets are received from the network at a network interface computer and passed to a computer on an internal network.

Implementations of the invention may include one or more of the following features. Before passing the encrypted network packets to the computer on the internal network, the destination computer for each encrypted network packet is determined. Determining the destination computer may include determining whether a source computer that sent each encrypted network packet is authorized to send encrypted network packets to the destination computer. Determining the destination computer may also include examining a field in a header of the network packet, and the field may correspond to a virtual network tunnel.

An encrypted network packet may be passed to the computer on the internal network if the computer on the internal network is determined to be the destination computer. Instead, the encrypted network packet may be decrypted at the network interface computer when the network interface computer is determined to be the destination computer. Network packets decrypted by the network interface computer may be passed to a computer on an internal network.

The method may also include encrypting network packets and sending the encrypted network packets from the network interface computer to the network. The computer on the internal network may encrypt the network packets, and the method may further include passing the encrypted network packets to the network interface computer. The network interface computer may be a firewall computer, and the network may be a public network.

In general, in another aspect, the invention features receiving encrypted network packets at a first computer over a network from a second computer, and examining a field in each network packet to determine which of a plurality of encryption algorithms was used to encrypt the network packet. The network packet is then decrypted in accordance with the determined encryption algorithm.

Implementations of the invention may include one or more of the following features. The field may be examined to determine a destination computer for each encrypted network packet. A determination may be made as to whether a source computer that sent each encrypted network packet is authorized to send encrypted network packets to the destination computer. Encrypted network packets may be passed to a computer on an internal network when the destination computer is determined to be the computer on the internal network. The network packets may be decrypted when the destination computer is determined to be the first computer, and the decrypted network packets may be passed to a computer on an internal network. The field may correspond to a virtual network tunnel, and the network may be a public network. The first computer may be a firewall computer.

In general, in another aspect, the invention features receiving network packets over a network, and determining which virtual tunnel each network packet was sent over is made. Each network packet is then routed to a destination computer in accordance with the determined virtual tunnel.

Implementations of the invention may include one or more of the following features. Each network packet may be decrypted in accordance with the determined virtual tunnel.

In general, in another aspect, the invention features encrypting network packets at a computer connected to an internal network and passing the network packets over the internal network to a network interface computer. The network interface computer then passes the encrypted network packets over a public network.

In general, in another aspect, the invention features receiving network packets from a network, and determining over which virtual tunnel each network packet was sent. A determination is also made as to whether the source computer that sent each network packet is authorized to send network packets over the determined virtual tunnel.

Implementations of the invention may include one or more of the following features. Each network packet may be routed to a destination computer in accordance with the determined virtual tunnel when the source computer is determined to be authorized.

Advantages of the invention may include one or more of the following. Using the policy id field to create virtual tunnels allows a receiving computer to determine both a packet's encryption algorithm and where the packet should be routed. Multiple tunnels between the same two computers allows packets encrypted with different encryption algorithms to be sent between the same computers. The virtual tunnels permit the encapsulating/decapsulating and encrypting/decrypting of network packets to be spread across multiple computers. Using the tunnel databases, the firewall computers may restrict access to particular tunnels and, in effect, perform packet filtering for each tunnel.

Other advantages and features will become apparent from the following description and from the claims.

DESCRIPTION

Figure 3:
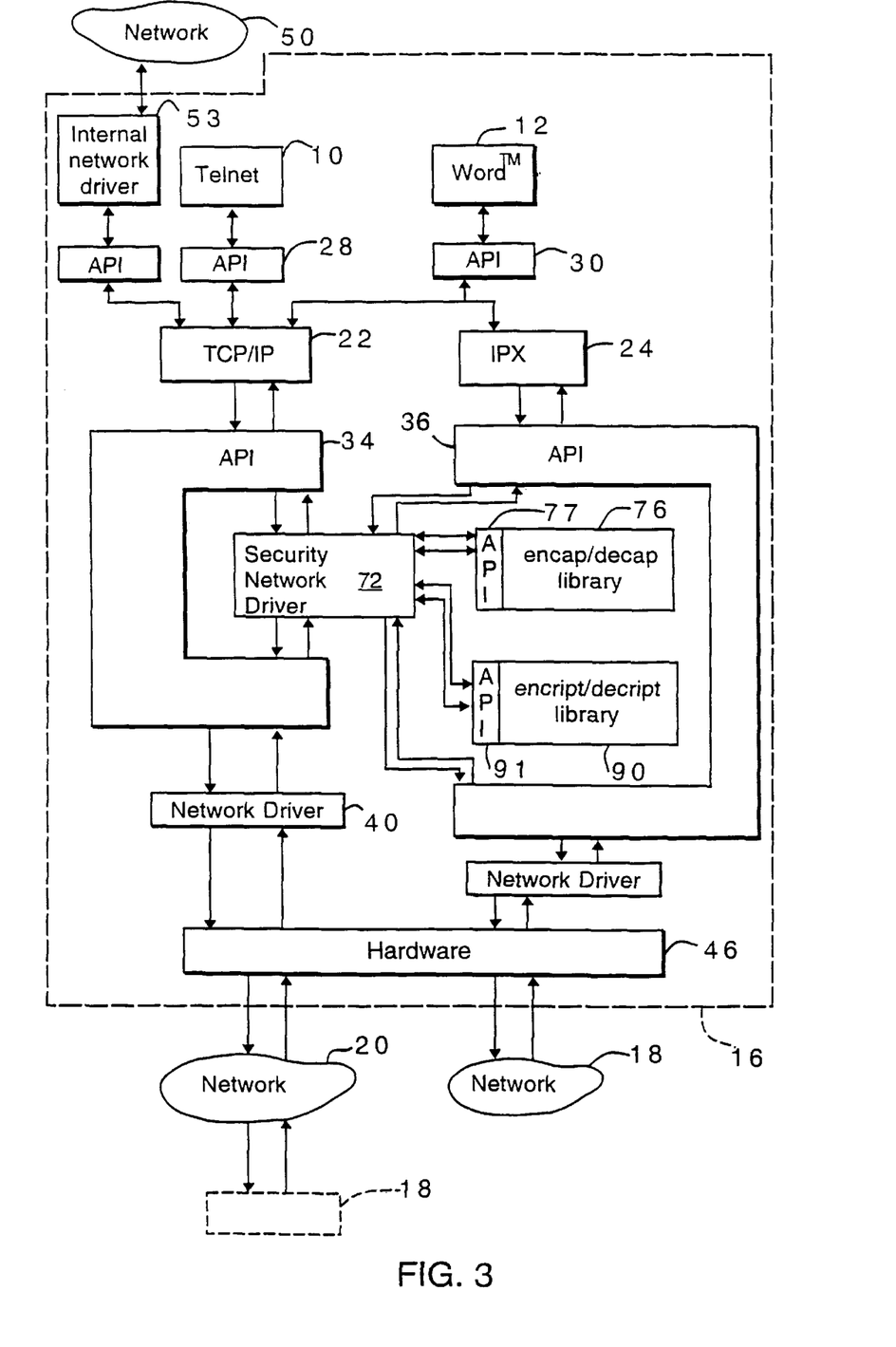
FIG. 3 is a block diagram of a computer including a security network driver.

As seen in FIG. 3, security network driver software 72 is inserted between network protocol TCP/IP 22 and corresponding network driver 40. The security network driver encrypts information before it is sent on the network by the network driver and decrypts information received from the network by the network driver before the information is sent to the network protocol. As a result, after choosing a security network driver with the required security features, users may freely choose among available applications and network protocols regardless of the required level of security and regardless of the available encryption/decryption libraries and without having to compromise their security needs. Moreover, the chosen applications and network protocols need not be modified. To change the level of security, the user may simply chose another security network driver or modify the current security network driver.

Generally, a computer's operating system software defines a "road map" indicating which applications may communicate with each other. To insert a security network driver between a network protocol and a network driver, the road map is altered. The vendor of the operating system software may make the road map available or the road map may be determined through observation and testing. Once the road map is altered, functions such as send and receive, between the network protocol and the network driver are diverted to the network security driver to encrypt data before it is sent on the network and to decrypt data when it is received from the network.

Figure 4:
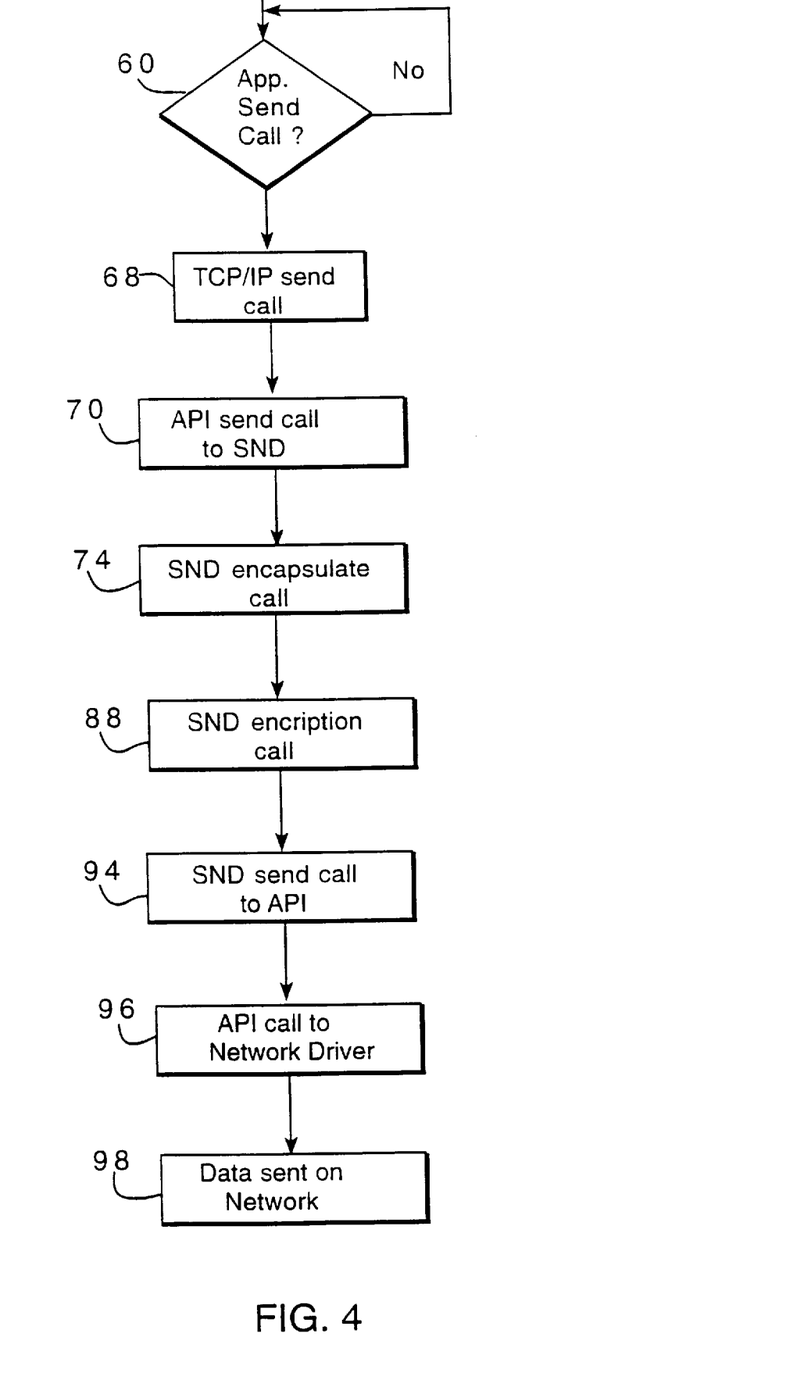
FIG. 4 is a flow chart of encapsulation and encryption.

Referring to FIGS. 3 and 4, as an example, to send data from computer 16 to computer 18 on the internet, Telnet 10 issues (step 60) a send call to TCP/IP 22 through network protocol API 28. The send call includes a network packet 62 (FIG. 5) having a header 64 and data 66. The header includes information such as the addresses of the source and destination computers and the type of application that sent the data. The network protocol then issues (step 68) a send call to the network driver API which, in accordance with the altered road map, issues (step 70) a send call to a security network driver (SND) 72.

Figure 5:
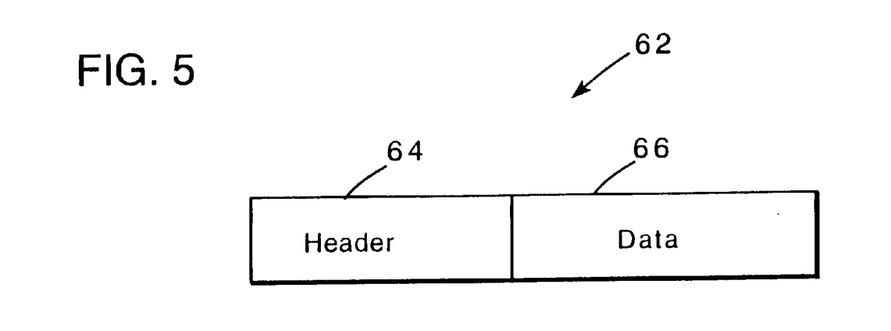
FIGS. 5 and 6 are block diagrams of network packets.
Figure 6:
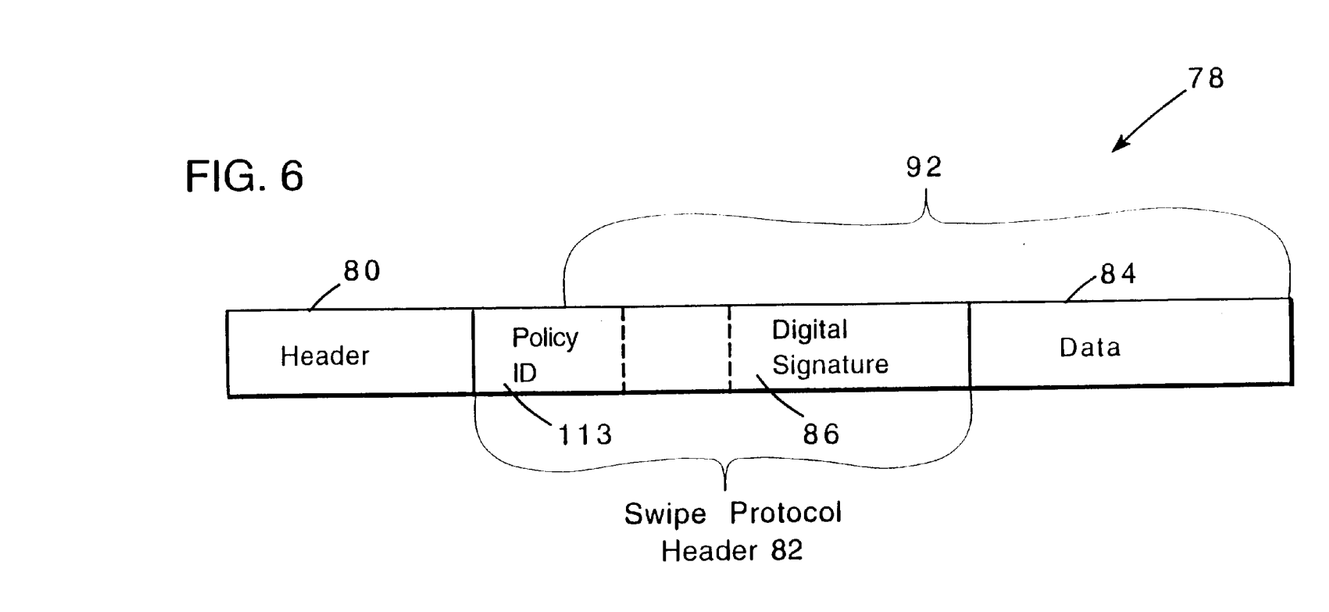

The security network driver issues (step 74) an encapsulate call to an encapsulate/decapsulate library 76 through an API 77. In one example, the encapsulate/decapsulate library uses the swIPe IP Security Protocol created by J. Ioannidis of Columbia University and M. Blaze of AT&T™, Inc. which is described in an Internet Draft dated Dec. 3, 1993 and incorporated by reference. Referring also to FIG. 6, the encapsulate call generates a new network packet 78 in accordance with the swIPe protocol. The new packet includes a header 80, a swIPe protocol header 82, and data 84. According to options within the swIPe protocol, header 80 may be the original header 64 (FIG. 5), in which case, data 84 is the original data 66, or header 80 may be a new header including the address of a source firewall computer, e.g., computer 16 (FIG. 2), and a destination computer which may also be a firewall computer, e.g., 18. Where header 80 is a new header, data 84 includes the entire original network packet 62 (FIG. 5).

After encapsulating the network packet, the security network driver issues (step 88, FIG. 4) an encryption call to an encryption/decryption library 90 (FIG. 3) through an API 91. Library 90 encrypts a portion 92 of the encapsulated network packet including data 84 and part of swIPe protocol header 82. Header 80 (FIG. 6) is not encrypted. Thus, if, according to options within the swIPe protocol, header 80 is the original header 64 (FIG. 5), then the addresses of the source and destination computers are visible on the internet. On the other hand, if header 80 is a new header including the addresses of firewall computers, then the addresses of internal source and destination computers are encrypted and not visible on the internet.

Library 90 may be of the type sold by RSA Data Security™, Inc. of Redwood City, California and may encrypt the data according to an RSA algorithm such as RC2 or RC4 or according to a federal information processing standard (FIPS) such as data encryption standard (DES).

The security network driver then issues (step 94) a send call, including the encapsulated/encrypted network packet, to the API, and the API, in accordance with the altered road map, issues (step 96) a send call to a network driver, e.g., network driver 40. The network driver then causes hardware 46 to transmit (step 98) the encapsulated/encrypted network packet on the network.

Figure 7:
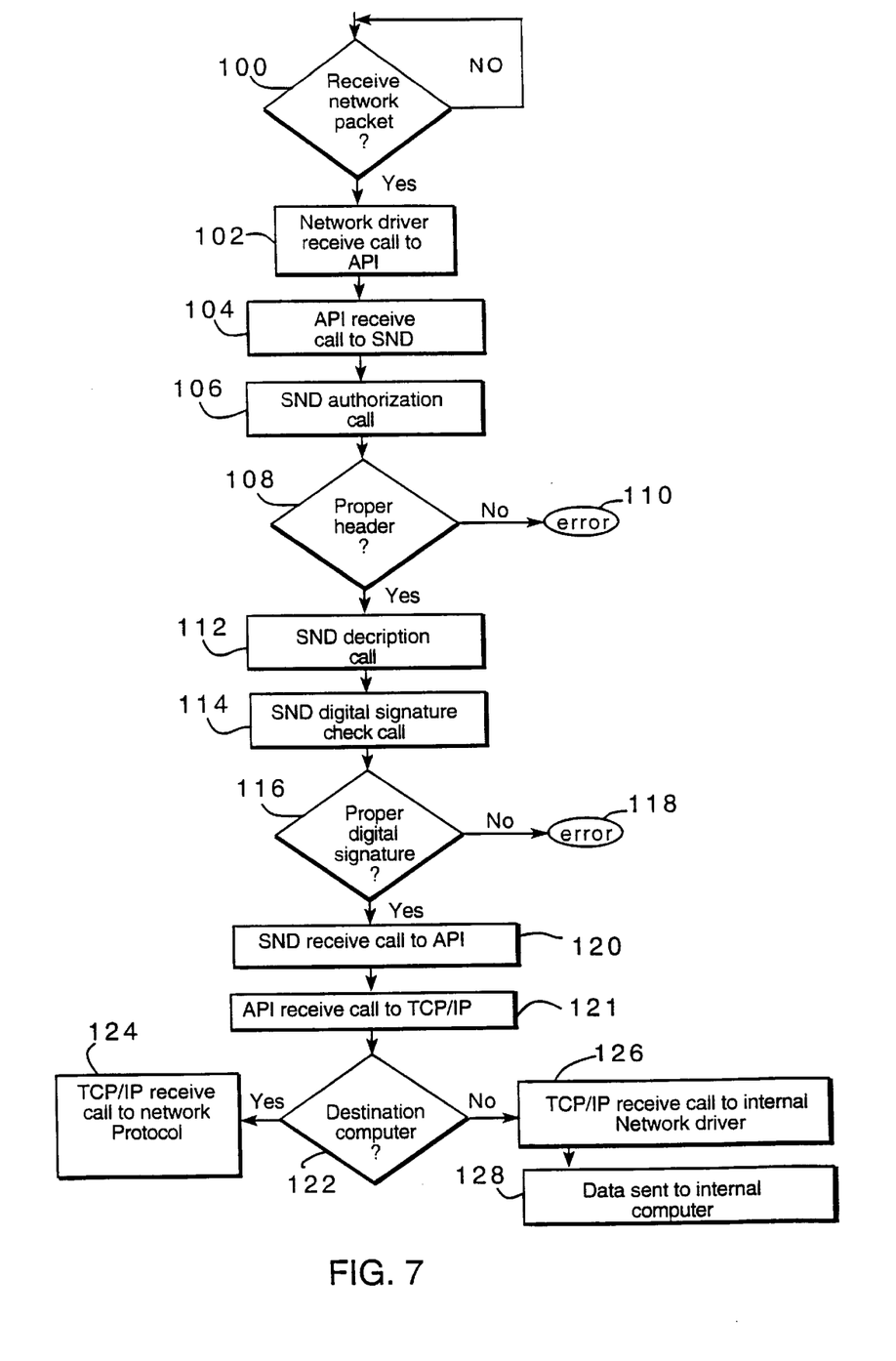
FIG. 7 is a flow chart of decryption and decapsulation.

Referring to FIGS. 3 and 7, the network drivers of each computer 16, 18 (FIGS. 2 and 3) maintain a database of addresses to which they will respond. For example, when network driver 40 receives (step 100) a properly addressed network packet from network 20, the network driver issues (step 102) a receive call to corresponding network protocol API 34. In accordance with the altered road map, the API issues (step 104) a receive call to security network driver (SND) 72 which issues (step 106) an authorization call to encapsulate/decapsulate library 76 through API 77. Library 76 examines the unencrypted portion of swIPe header 82 (FIG. 6) to determine (step 108) whether it is proper. If it is not proper, an error (step 110) is flagged.

If the header 82 is not a swIPe header, then the security network driver issues a receive call to the API including the unaltered packet.

If the swIPe header is proper, the security network driver issues (step 112) a decryption call to encryption/decryption library 90 through API 91. A portion of the unencrypted swIPe protocol header includes a policy identification (id) field 113. The policy id field indicates the encryption algorithm used to encrypt the data. Library 90 uses a secret key that was previously exchanged between the computers and the encryption algorithm to decrypt data 84.

After decryption, the security network driver issues (step 114, FIG. 7) a digital signature check call to encapsulate/decapsulate library 76. The swIPe protocol header includes a digital signature 86. The digital signature is a unique number calculated using the data in the network packet, the secret key, and a digital signature algorithm. Library 76 recalculates the digital signature and compares (step 116) it to digital signature 86 in the network packet. If the network packet is tampered with during transmission and any data within the packet is changed, then the digital signature in the packet will not match the digital signature generated by the receiving computer and an error (step 118) will be flagged.

If the signatures match, then the security network driver issues (step 120) a receive call to the API which issues (step 121) a receive call to the TCP/IP network protocol including only the original network packet 62 (FIG. 5, data 66 and addresses of the source and destination computers 64). If (step 122) the network packet is destined for computer 16, then TCP/IP issues (step 124) a receive call to an application 10, 12 and if the network packet is destined for a computer on an internal network, e.g., computer 54 (FIG. 2) on network 50, then TCP/IP issues (step 126) a receive call to internal network driver 53 which then sends (step 128) the data to the internal computer.

Figure 8:
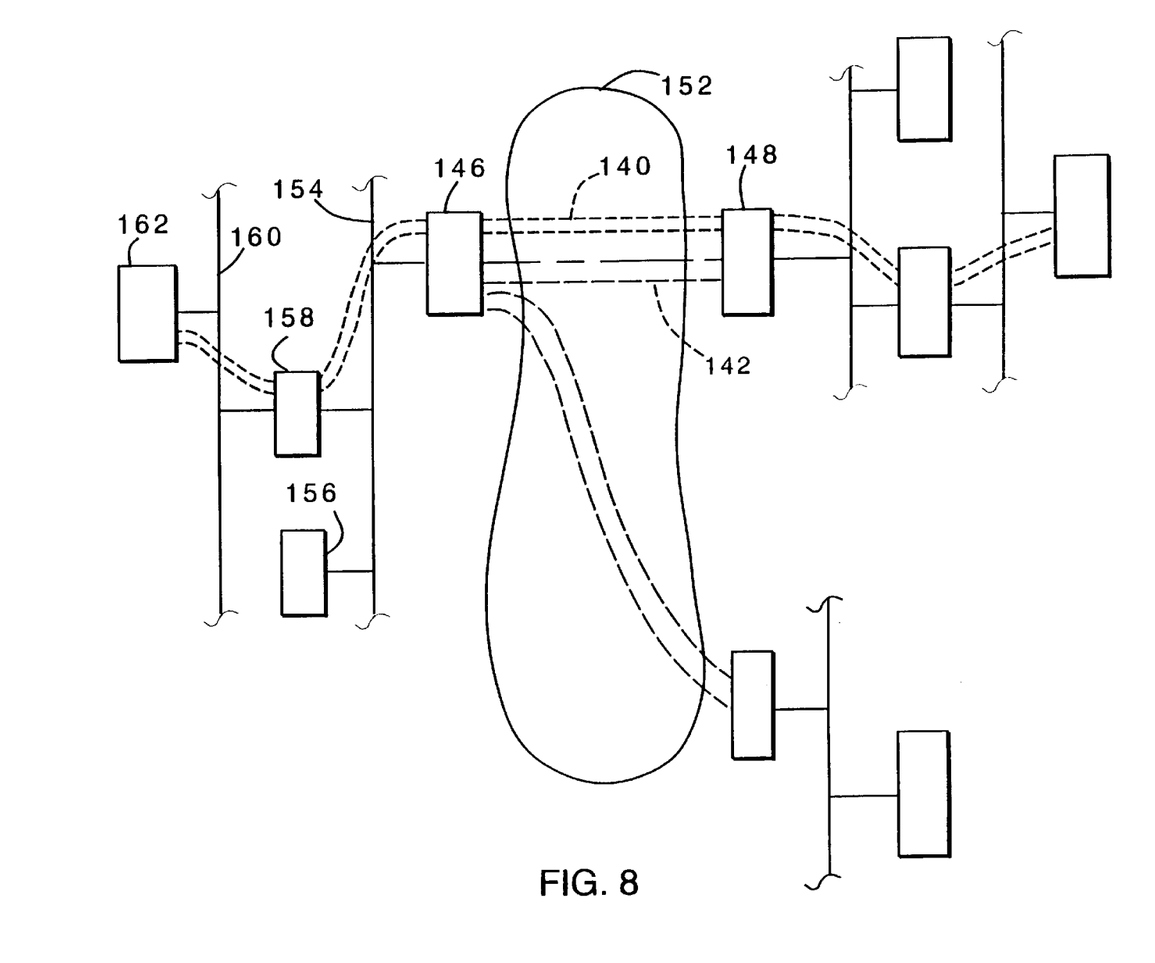
FIG. 8 is a block diagram of virtual tunnels.

Referring to FIG. 8, the policy id field may be used to create virtual tunnels 140, 142 between firewall computers 146, 148 on internet 152. When computer 146 receives a network packet, it checks the policy id to determine which "tunnel" the packet came through. The tunnel indicates the type of encryption algorithm used to encrypt the packet.

Multiple tunnels 140, 142 may connect two computers 146, 148 and each tunnel may use a different encryption algorithm. For example, tunnel 140 may use the RC2 encryption algorithm from RSA Data Security™, Inc. while tunnel 142 uses the FIPS DES encryption algorithm. Because the RC2 encryption algorithm is less secure and requires less computer processing time than the FIPS DES standard, users may send a larger number of network packets requiring less security over tunnel 140 as opposed to tunnel 142. Similarly, predetermined groups of users or computers may be restricted to sending their packets over particular tunnels (effectively attaching a packet filter to each tunnel).

The tunnel may also indicate where the packet is to be sent. Primary firewall computers 16, 18 store information about the internal path of each tunnel in a tunnel database. When computer 146 receives a packet whose policy id indicates that the packet came through a tunnel that ends at computer 146, e.g., tunnel 142, computer 146 decapsulates and decrypts the packet and sends the decrypted packet over internal network 154 to the proper destination computer in accordance with the decrypted destination address. When computer 146 receives a packet whose policy id indicates that it came through a tunnel that does not end with computer 146, e.g., tunnel 140, computer 146 does not decapsulate and decrypt the packet. Instead, computer 146 sends the encrypted packet to internal firewall computer 158 in accordance with the tunnel database.

Internal firewall computer 158 also has a tunnel database in which the internal path of any tunnels connected to computer 158 are stored. As a result, when computer 158 receives a packet whose policy id indicates that it came through a tunnel that ends with computer 158, e.g., tunnel 140, it decapsulates and decrypts the packet according to the policy id and sends the decrypted packet over internal network 160 to computer 162 in accordance with the decrypted destination address.

The only addresses visible on the internet and on internal network 154 are the addresses of the firewall computers 146, 148, and 158. The address of internal computer 162 and, hence, the network topology of network 160 are protected on both the internet and internal network 154.

The tunnel databases provide the firewall computers 146, 148, and 158 with information as to the internal path of the tunnels. Thus, if computer 162 was another firewall computer, computer 146 may modify the destination address of packets received on tunnel 140 to be the address of computer 162 to cause computer 158 to send the packet directly to computer 162 without checking the policy id field.

Encapsulating/decapsulating and encrypting/decrypting network packets may require a large portion of a computer's processing power. Creating virtual tunnels using the policy id field allows the encapsulating/decapsulating and encrypting/decrypting of network packets to be spread across several computers. For example, computer 146 may decapsulate and decrypt network packets destined for computers connected to internal network 154 while computer 158 may decapsulate and decrypt network packets destined for computers connected to internal networks 154 and 160. Similarly, computer 146 may encapsulate and encrypt network packets sent from computers connected to internal network 154 while computer 158 may encapsulate and encrypt network packets sent from computers connected to internal networks 154 and 160.

Figure 9:
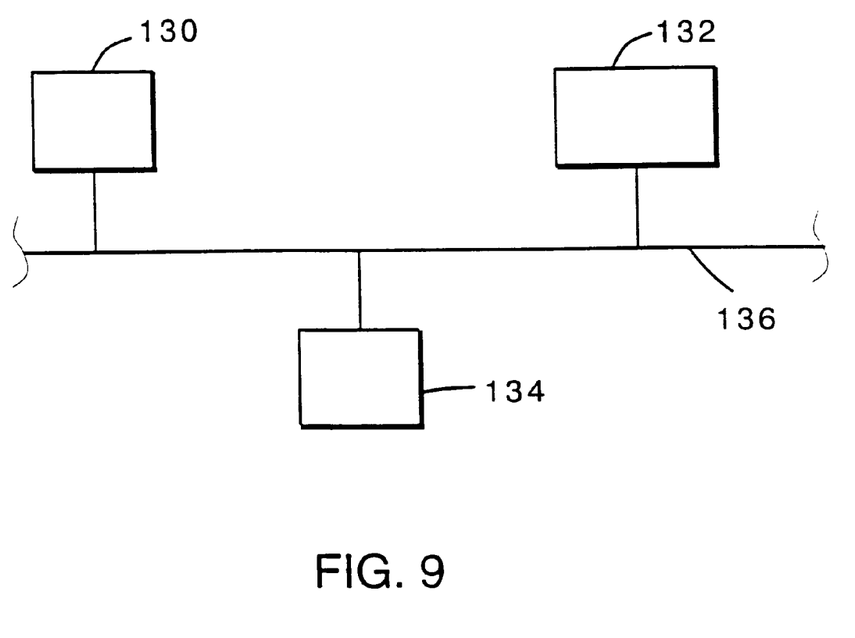
FIG. 9 is a block diagram of a computer network.

The Kerberos Key Distribution Center components of Kerberos Network Authentication System created under project Athena at Massachusetts Institute of Technology, defines one method of providing computers with secret keys. Referring to FIG. 9, computer 130 is termed the "trusted" computer, and before computers 132 and 134 may transfer encrypted data to each other over network 136, both computers send a request to trusted computer 130 for a secret key. For a more detailed description of the Kerberos Key Distribution Center, see RFC1510 (request for comment) "Kerberos Network Authentication Service" by J. Kohl & B. Neuman, Sept. 10, 1993, which is incorporated by reference.

Referring back to FIG. 2, to transfer secure (i.e., encapsulated and/or encrypted) network packets between two computers, operators of the two computers may verbally exchange a secret key for each tunnel between the computers and then manually initialize the computers to transfer data by generating a tunnel record including a secret key for each tunnel between the two computers. Firewall computers are typically managed by skilled technicians capable of generating tunnel records. Typical users have non-firewall computers and may wish to transfer encapsulated/encrypted data with a firewall computer. To avoid requiring that a typical user generate tunnel records and instead of having a separate trusted computer provide secret keys to two computers, a firewall computer 16, 18 may provide secret keys to other computers.

Figure 10:
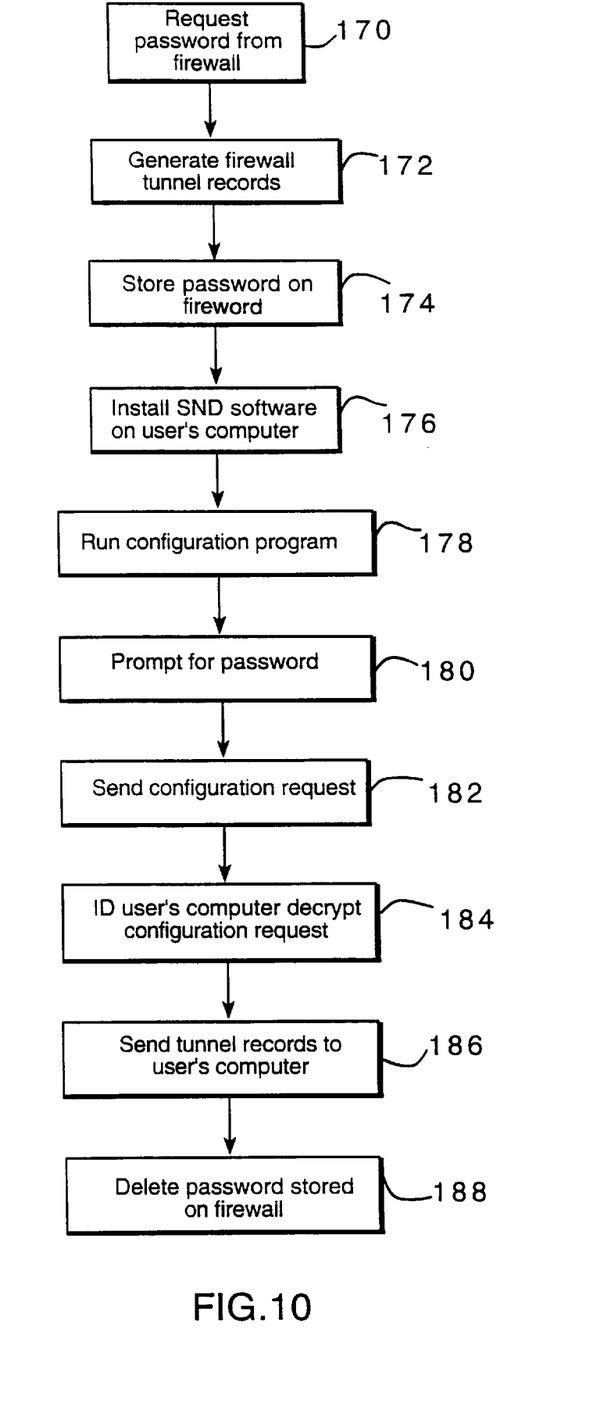
FIG. 10 is a flow chart of tunnel record generation.

Referring also to FIG. 10, when a user wishes to transfer packets between his/her computer and a firewall computer, the user requests (step 170) a password (a onetime pad) from the firewall operator. The operator then generates (step 172) tunnel records for each tunnel over which the user's computer and the firewall computer may transfer network packets. The operator also stores (step 174) the password given to the user on the firewall computer. The user installs (step 176) the security network driver (SND) software on his/her computer and runs (step 178) a configuration program. The configuration program prompts (step 180) the user for the password and sends (step 182) a configuration request to the firewall computer.

The firewall computer identifies (step 184) the user's computer as the sender of the request and notifies the user's computer of the available tunnels by sending (step 186) the complete tunnel records, including secret keys, associated with each tunnel to the user's computer. The tunnel records are sent through network packets that are encrypted using the password and the encryption algorithm. Afterwards, the firewall deletes (step 188) the password, and further network packets are transmitted between the two computers through the available tunnels and encrypted according to the secret key associated with each tunnel.

Figure 11:
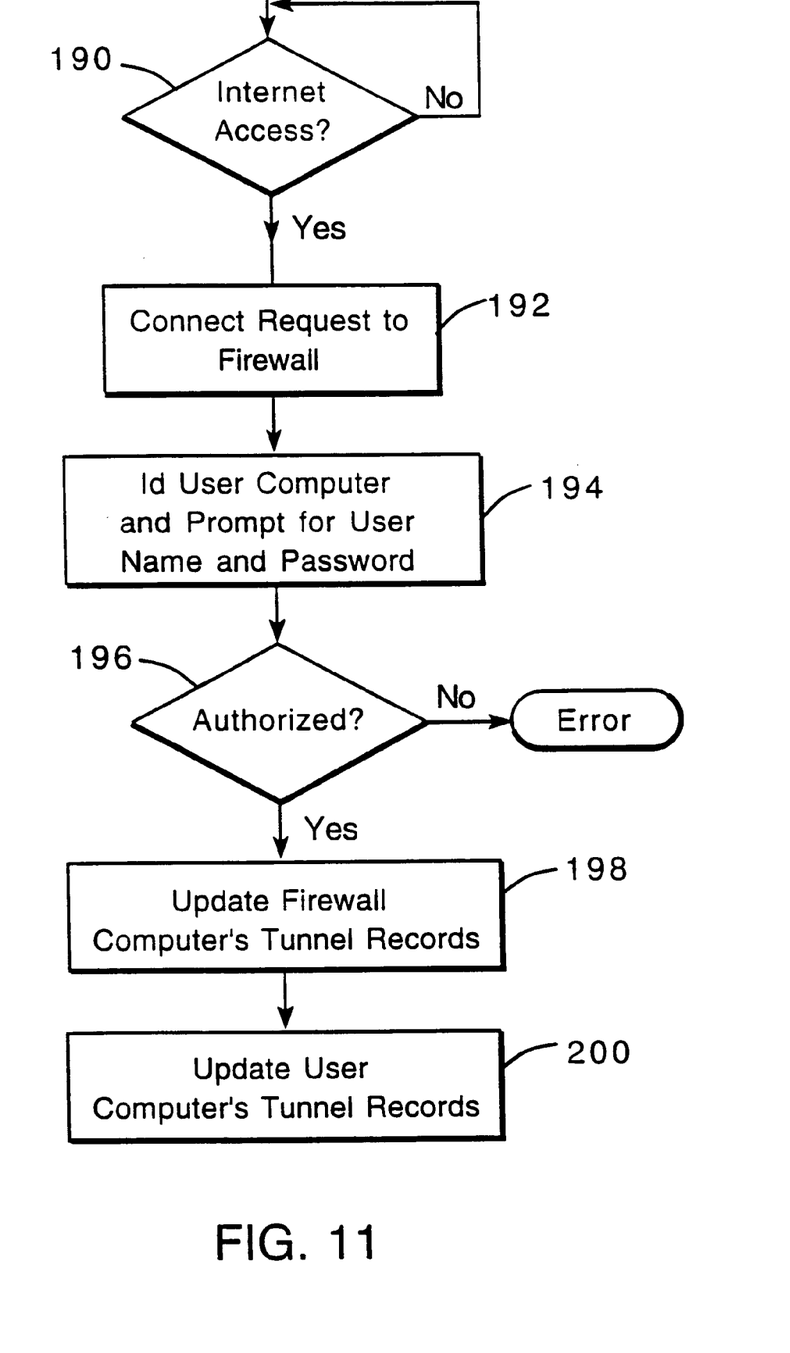
FIG. 11 is a flow chart of tunnel record updating.

Referring to FIG. 11, generally, each time the user's computer accesses (step 190) the internet, a new internet address is assigned. The firewall computer needs to know the new address in order to update the tunnel records. To notify the firewall computer of the new internet address, each time the user's computer accesses the internet, the configuration software issues (step 192) a connect request to the firewall computer. The firewall computer identifies (step 194) the computer and may prompt the user for a user name and a user password. If the user name and password are authorized (step 196), the firewall updates (step 198) the tunnel records with the internet address sent as part of the connect request. The configuration software also updates (step 200) the non-firewall computer's tunnel records with the computer's new internet address.

Other embodiments are within the scope of the following claims.

For example, instead of encapsulating the network packets using the swIPe protocol header, other internet security algorithms may be used.

Although the security network driver was described with respect to send and receive functions, APIs from different manufacturers, for example, Sun™, Inc. and Microsoft™, Inc., include a variety functions, and the security network driver is designed to respond to each possible function.

The security network driver may also be simultaneously connected to multiple network protocols, e.g., both TCP/IP 22 and IPX 24, as shown in FIG. 3.

What is claimed is:

1. A method of handling network packets, comprising:
    receiving an encrypted network packet from an external network at a first computer; and
    determining whether to decrypt the encrypted network packet at the first computer or to pass the encrypted network packet to a computer on a network that is internal with respect to the first computer for decryption.

2. The method of claim 1, further comprising, before passing the encrypted network packet to the computer on the network that is internal with respect to the first computer
    determining a destination computer for the encrypted network packet.

3. The method of claim 2, wherein determining a destination computer further includes:
    determining whether a source computer that sent the encrypted network packet is authorized to send encrypted network packets to the destination computer.

4. The method of claim 2, wherein determining a destination computer includes:
    examining an index field in a header of the network packet.

5. The method of claim 4, wherein the field corresponds to a virtual network tunnel.

6. The method of claim 2, wherein an encrypted network packet is passed to the computer on the network that is internal with respect to the first computer when the destination computer for the encrypted network packet is determined to be the computer on the network that is internal with respect to the first computer.

7. The method of claim 1, further comprising:
    decrypting an encrypted network packet at the first computer when the destination computer for the encrypted network packet is determined to be the first computer.

8. The method of claim 7, further comprising:
    passing the decrypted network packet to the computer on the network that is internal with respect to the first computer.

9. The method of claim 1, further comprising:
    encrypting network packets; and
    sending encrypted network packets from the first computer to the external network.

10. The method of claim 9, wherein the computer on the network that is internal with respect to the first computer encrypts the network packets, and further comprising:
    passing the encrypted network packets to the first computer.

11. The method of claim 1, wherein the first computer comprises a firewall computer.

12. The method of claim 1, wherein the external network comprises a public network.

13. A method of handling network packets, comprising:
    receiving an encrypted network packet from a public network at a firewall computer;
    determining the destination computer of the encrypted network packet by examining a virtual tunnel field that corresponds to the method of encryption;
    determining whether a source computer that sent the encrypted network packet is authorized to send encrypted network packets to the destination computer; and
    determining whether to decrypt the encrypted network packet at the firewall computer or to pass the encrypted network packet to a computer on a network that is internal with respect to the first computer for decryption.

14. A method of handling a network packet, comprising:
    receiving an encrypted network packet at a first computer over a network from a source computer;
    examining a field in the network packet to determine which of a plurality of encryption algorithms was used to encrypt the network packet and to determine a destination computer for each encrypted network packet; and
    decrypting the network packet at the determined destination computer.

15. The method of claim 14, further comprising:
    determining whether a source computer that sent each encrypted network packet is authorized to send encrypted network packets to the destination computer.

16. The method of claim 14, further comprising:

passing encrypted network packets to a computer on an internal network when the destination computer is determined to be the computer on the internal network.

17. The method of claim 14, further comprising:

decrypting network packets when the destination computer is determined to be the first computer.

18. The method of claim 17, further comprising:

passing the decrypted network packets to a computer on an internal network.

19. The method of claim 14, wherein the field corresponds to a virtual network tunnel.

20. The method of claim 14, wherein the network comprises a public network.

21. The method of claim 14, wherein the first computer comprises a firewall computer.

22. A method of handling an encrypted network packet, comprising:

receiving the encrypted network packet sent over a network at a first computer;

determining which virtual tunnel the network packet was sent over; and routing the network packet to a destination computer that is internal with respect to the first computer in accordance with the determined virtual tunnel.

23. The method of claim 22, further comprising:

decrypting each network packet in accordance with the determined virtual tunnel.

24. A method of handling a network packet, comprising:

encrypting network packets at a first computer connected to an internal network;

storing a virtual tunnel identifier in the packet that is used to determine routing of the packet;

passing the encrypted network packet over the internal network to a public network interface computer; and passing the encrypted network packet over a public network connected to the public network interface computer.

25. A method of handling network packets, comprising:

receiving network packets sent over a network at a first computer;

examining each packet's virtual tunnel field to determine which virtual tunnel each network packet was sent over and whether a source computer that sent each network packet is authorized to send network packets over the determined virtual tunnel.

26. The method of claim 25, further comprising:

routing each network packet to a destination computer in accordance with the determined virtual tunnel when the source computer is determined to be authorized.

* * * * *

(12) EX PARTE REEXAMINATION CERTIFICATE (8918th)
United States Patent
Kirby et al.

(10) Number: US 5,898,784 C1
(45) Certificate Issued: Mar. 27, 2012

(54) TRANSFERRING ENCRYPTED PACKETS OVER A PUBLIC NETWORK

(75) Inventors: Alan J. Kirby, Hollis, NH (US); Jeffrey A. Kraemer, Northboro, MA (US); Ashok P. Nadkarni, Shrewbury, MA (US)

(73) Assignee: Symantec Corporation, Cupertino, CA (US)

Reexamination Request:
No. 90/009,859, Dec. 3, 2010

Reexamination Certificate for:
Patent No.: 5,898,784
Issued: Apr. 27, 1999
Appl. No.: 08/963,512
Filed: Nov. 3, 1997

Related U.S. Application Data (63) Continuation of application No. 05/586,230, filed on Jan. 16, 1996, now abandoned.

(51) Int. Cl.
*H04L 29/06* (2006.01)
*G06F 1/00* (2006.01)

(52) U.S. Cl. ........................................................ 713/153
(58) Field of Classification Search .................... 380/49
See application file for complete search history.

(56) References Cited

To view the complete listing of prior art documents cited during the proceeding for Reexamination Control Number 90/009,859, please refer to the USPTO's public Patent Application Information Retrieval (PAIR) system under the Display References tab.

*Primary Examiner* — Mark Sager

(57) ABSTRACT

The invention features receiving encrypted network packets sent over a network at a network interface computer, and passing the encrypted network packets to a computer on an internal network.

The invention also features receiving encrypted network packets at a first computer over a network from a second computer, examining a field in each network packet to determine which of a plurality of encryption algorithms was used to encrypt the network packet, and decrypting the network packet in accordance with the determined encryption algorithm.

The invention further features receiving network packets sent over a network, determining which virtual tunnel each network packet was sent over, and routing each network packet to a destination computer in accordance with the determined virtual tunnel.

The invention features encrypting network packets at a computer connected to an internal network, passing the encrypted network packet over the internal network to a public network interface computer, and passing the encrypted network packet over a public network connected to the network interface computer.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-13, 16, 18-19 and 22-26 is confirmed.

Claims 14-15, 17 and 20-21 are cancelled.

* * * * *